United States Patent
Van Der Spoel

(10) Patent No.: US 6,251,277 B1
(45) Date of Patent: Jun. 26, 2001

(54) METHOD AND DEVICE FOR PURIFYING PROTEIN CONTAINING WASTE WATER

(75) Inventor: Jelle Van Der Spoel, Neede (NL)

(73) Assignee: Friesland Brands B.V., Leeuwarden (NL)

( * ) Notice: Subject to any disclaimer, the term of this patent is extended or adjusted under 35 U.S.C. 154(b) by 0 days.

(21) Appl. No.: 08/832,869

(22) Filed: Apr. 4, 1997

(30) Foreign Application Priority Data

Apr. 4, 1996 (NL) .................................................. 1002797

(51) Int. Cl.[7] ................................ C02F 1/24; C02F 3/02; C02F 3/12
(52) U.S. Cl. ...................... 210/608; 210/624; 210/625; 210/629; 210/705; 210/724; 210/725; 210/732
(58) Field of Search ................................ 210/703, 608, 210/705, 624, 625, 629, 704, 724, 725, 732

(56) References Cited

U.S. PATENT DOCUMENTS

| 3,313,795 | * | 4/1967 | Rubin . |
|---|---|---|---|
| 3,444,076 | * | 5/1969 | Sekikawa . |
| 3,959,131 | * | 5/1976 | Ramirez . |
| 3,969,203 | * | 7/1976 | Ramirez . |
| 4,001,114 | * | 1/1977 | Joseph . |
| 4,061,568 | * | 12/1977 | Hall . |
| 4,340,487 | * | 7/1982 | Lyon . |
| 4,728,517 | * | 3/1988 | Markham . |
| 4,828,577 | * | 5/1989 | Markham . |
| 4,933,087 | * | 6/1990 | Markham . |
| 5,364,529 | * | 11/1994 | Morin . |
| 5,514,282 | * | 5/1996 | Hibbard et al. . |
| 5,540,836 | * | 7/1996 | Coyne . |

FOREIGN PATENT DOCUMENTS

| 111379 | * | 12/1982 | (EP) . |
|---|---|---|---|
| 2 648 309 | | 6/1989 | (FR) . |
| 91/08175 | * | 12/1990 | (WO) . |
| 92/19547 | | 11/1992 | (WO) . |

OTHER PUBLICATIONS

Zimmerman et al, "Poultry Waste Pretreatment Through Dissolved Air Flotation Coupled with Lime–Polymer Conditioning–" Proc Purdue Ind Waste Conf, 1981 p. 586.*

* cited by examiner

Primary Examiner—Thomas M. Lithgow
(74) Attorney, Agent, or Firm—Gilberto M. Villacorta; Pepper Hamilton LLP

(57) ABSTRACT

The invention relates to a method for purifying protein containing waste water, In which a) a first insoluble material is caused to form in the waste water, b) the mixture obtained in step a) is separated to form pre-purified waste water, c) the pre-purified waste water is treated with aerobic microorganisms and d) the mixture obtained in step c) is separated to form finely purified waste water, and in which step b) and step d) are carried out in the same device. Preferably, steps b) and d) are alternately carried out in the same device.

5 Claims, 1 Drawing Sheet

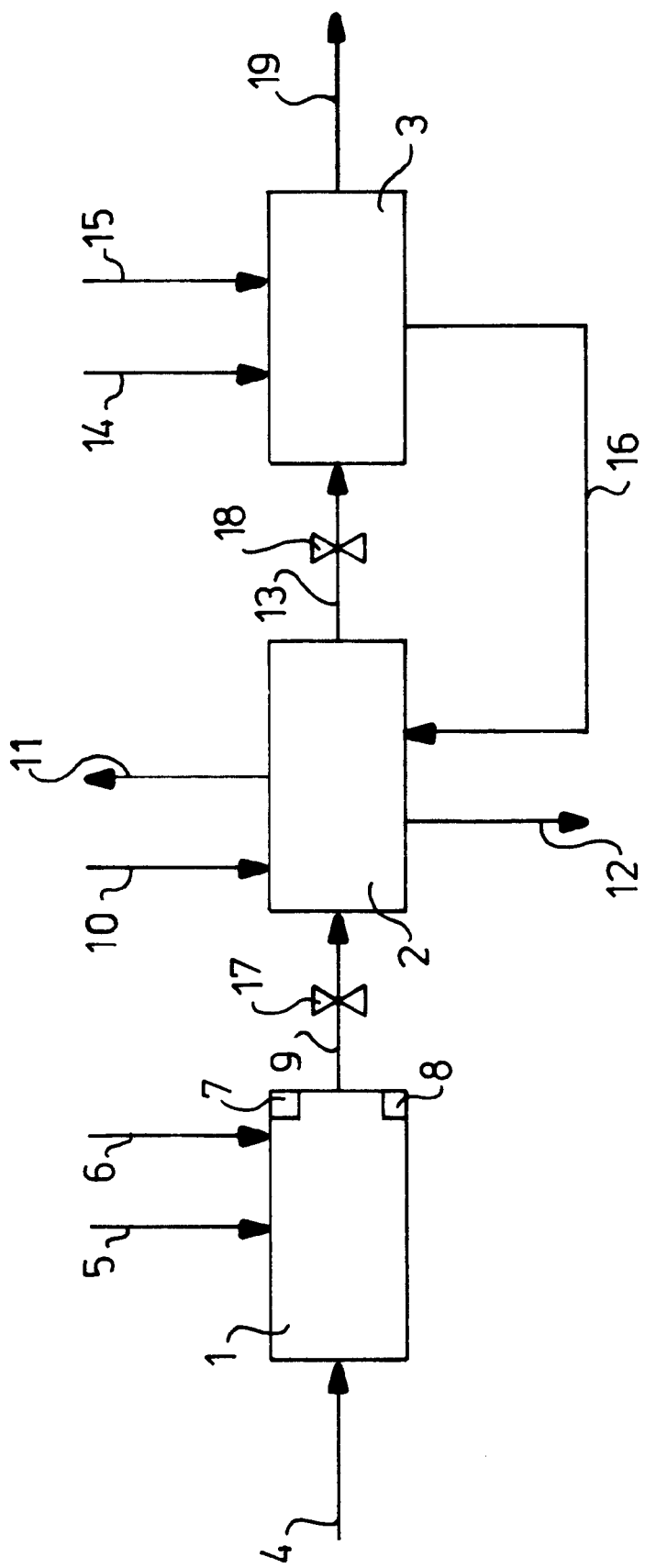

METHOD AND DEVICE FOR PURIFYING PROTEIN CONTAINING WASTE WATER

The invention relates to a method for purifying protein containing waste water, in which (a) a first insoluble protein containing material is caused to form in the waste water, (b) the mixture obtained in step (a) is separated to form pre-purified waste water, (c) the pre-purified waste water is treated with aerobic microorganisms and (d) the mixture obtained in step (c) is separated to form finely purified waste water. The invention also relates to a device for purifying protein containing waste water.

WO 92/19547 describes a method and device for purifying waste water containing carbohydrates, proteins and fats. In this method, waste water is fed in a first step to a first aeration tank which contains microorganisms. Then a cationic and/or an anionic polymer and possibly a solution of an iron(III) salt in water is fed to the waste water to make some of the microorganisms flocculate and to remove phosphate. The waste water is then fed to a flotation device, where it is separated into flotation sludge and a first effluent. The first effluent is then fed to a second aeration tank which also contains microorganisms and is provided with a separating device. In said second aeration tank, the first effluent is purified to form purification sludge and a second effluent. Some of the purification sludge is then fed back to the first aeration tank and another portion is fed back to the second aeration tank. According to WO 92/19547. The method and the device are suitable, in particular, for purifying waste water originating from a foodstuffs processing factory.

The method and the device according to WO 92/19547 have, however, a number of disadvantages. Both the first and the second purification step comprise a biological purification with the aid of microorganisms. Because, in particular, the biological purification in the first step requires a large amount of oxygen, the energy consumption is high in the first stap. If sufficient oxygen cannot be fed to the device, for example if the waste water to be purified containing a large amount of impurities, a strong stench due to rotting may be produced, which is disadvantageous for this immediate dwelling and working environment of the device, The purification sludge as such is also no longer directly usable, for example in agriculture or as an additive for livestock fodders. One more disadvantage of the device according to WO 92/19547 is that the device must be operated for an expedient employment on a relatively large scale, which not only imposes a load on the available space, our also requires large investment.

The present invention provides a solution to the problems described above. The invention therefore provides a method and a device as stated in the introduction, in which proteins and other constituents, such as fats and carbohydrates, are removed from waste water in a very expedient way. According to the invention, a purification sludge is also obtained which has much nutritive value for livestock and which can therefore be used preeminently as an additive to livestock fodders. According to the invention, phosphate, which is present in the waste water, is also removed to a large extent from the waste water. A further advantage of the invention is that there is no risk of the occurrence of stench. Yet one more advantage of the invention is that the scale of the device can be relatively small. The invention therefore relates to a method as stated in the preamble, in which step (b) and step (d) are carried out in the same device.

Although it is possible to carry out the steps (b) and (d) simultaneously in the so a device, for example by feeding back an effluent which in obtained in step (c), or a portion thereof, this has the disadvantage that mixing occurs, inter alia, of pre-purified and finely purified water. In addition, a sludge is formed both in step (b) and in step (d). Mixing of sludge obtained in step (b) and sludge obtained in step (d) would therefore also be obtained. According to the invention, the steps (b) and (d) are therefore preferably also carried out alternately in the same device.

Advantageously, the method according to the invention is carried out batchwise, that is to say that the steps (a)–(d) are carried out in the sequence specified and not simultaneously. However, step (a) can indeed be carried out during the carrying out of step (b), (c) or (d) using another batch of waste water. As will be clear to the person skilled in the art, this will be a more expedient implementation of the method according to the invention. Preferably, step (a) is therefore carried out during steps (b) and/or (c) and/or (d).

Waste water, in particular waste water from foodstuffs—and milk-processing Industries, contains, inter alia, proteins, carbohydrates and fats. It has been found that essentially the proteins and the fats are advantageously removed from the waste water in a first step and the other constituents, generally carbohydrates, are then removed in a second step. To remove proteins, it is necessary for the pH of the waste water to be adjusted to a correct value for causing a first insoluble protein containing material to form. The term "insoluble" is understood here as meaning that, although a small amount of the protein containing material may be present in the waste water in dissolved form, most of the material is precipitated.

The pH of the waste water is preferably adjusted in such a way that the proteins present in the waste water coagulate and/or flocculate. It is, however, possible that some of the proteins are already present in undissolved form. According to the invention, the pH of the waste water is therefore adjusted during step (a) to a value which is preferably in the region of the coagulation point of the proteins.

Coagulation is understood to mean a chemical process in which colloidal particles, such as proteins, which are present in the waste water, agglomerate to form larger particles as a result of adding materials which interact with the colloidal particles. The consequence of said interaction is that the colloidal particles agglomerate to form larger agglomerates which readily settle, During coagulation, flocculation may also occur. Flocculation is a physico-chemical process, in which agglomerates of colloidal particles are formed by mutually forming bridges between the colloidal particles or by neutralizing the charge of the colloidal particles.

As described above, the pH of the waste water is advantageously adjusted during step (a) to a value at which a first protein containing material precipitates. The adjustment of the pH is carried out by adding an acid or a base to the waste water. Suitable acids are inorganic acids, for example sulphuric acid, nitric acid and hydrochloric acid, and organic acids, for example acetic acid and formic acid. Suitable bases are primarily inorganic bases, for example potassium hydroxide, sodium hydroxide and ammonium hydroxide. Preferably, an inorganic acid, in particular nitric acid, is used as acid and an inorganic base, in particular sodium hydroxide, is used as base. According to the invention, the pH is preferably adjusted to a value of 7–10 and, in particular, to a value of 8.5–9.5.

To cause coagulation to take peace, a first coagulating material should be added, in which connection the first coagulating material may be an anionic or a cationic polymer or a combination of an anionic and a cationic polymer. It has been found, however, that the coagulating material is advantageously an anionic polymer. According to the invention, an anionic polymer, preferably a strongly anionic polymer suitable for consumption in certain quantities, and in particular the anionic polymer "Supervlok A150" which is marketed by the company Cytec Industries B.V., is therefore added prior to step (b). This anionic polymer is a copolymer of acrylaxids of which some are anionically active.

The amount of anionic polymer which is added depends strongly on the degree of contamination, in particular the contamination in the form of proteins and fats, of the waste water. It will be clear to the person skilled in the art that more anionic polymer will have to be added as the level of contamination of the waste water increases. However, an amount of approximately 1–100 ppm, relative to the amount of waste water, will often be added and preferably an amount of 5–20 ppm of the anionic polymer will be added.

Prior to step (b) a solution of a metal salt in water may also be added because the presence of a metal salt in the waste water promotes the coagulation and/or flocculation of the proteins and fats and the removal of phosphate. Preferably, a solution of iron(III) chloride or of aluminum (III) chloride in water is added.

During the coagulation and/or flocculation of the proteins and fats to form the larger agglomerates, phosphate is also removed. It has been found that the phosphate is removed from the waste water essentially in the form of calcium phosphate because it is entrapped by the larger agglomerates of the proteins and fats.

As has been described above, according to the invention, the proteins, fats and phosphate, in particular calcium phosphate, are preferably essentially moved from the waste water during steps (a) and (b), and the other constituents, in particular the carbohydrates, are removed during steps (c) and (d). To remove these other constituents, it is advantageous to use a second coagulating material. Said second coagulating material may be an anionic or a cationic polymer or a combination of an anionic and a cationic polymer. The second coagulating material is preferably a cationic polymer, more preferably a strongly cationic polymer which is suitable for consumption in certain amounts and, in particular, the cationic polymer "c496", which is marketed by the company Cytec Industries B.V., Said cationic polymer is a copolymer of acrylamides, some of which are cationically active. According to the invention, the second coagulating material is preferably added after adding the first coagulating material. According to the invention, an amount of a cationic polymer is therefore added after step (c).

The amount of the cationic polymer which is added depends strongly on the degree of contamination, in particular the contamination in the form of proteins and fats, of the waste water. It will be clear to the person skilled in the art that more cationic polymer will have to be added as the level of contamination of the waste water increases. However, an amount of approximately 1–100 ppm, relative to the amount of waste water, and preferably an amount of 5–20 ppm of the cationic polymer will often be added.

According to the invention, the purification is preferably carried out at a temperature of approximately 5–45° C., in particular at a temperature of 20–40° C.

The exceptional expediency of the method according to the invention is evident from the fact that, in general, at least 80%, and usually even more than 90%, of the proteins and fats are removed during the steps (a) and (b). It has furthermore been found that, in general, the chemical oxygen demand (COD) of the finely purified water is after steps (a)–(d) at most only 10% of the chemical oxygen demand of the original waste water.

The invention also relates to a device for purifying protein containing waste water. The device comprises a first tank which is connected to a flotation device. The flotation device is also connected to a second tank in which microorganisms are present.

A preferred embodiment of said device is shown in the figure. Said embodiment comprises a tank 1 which is provided with feed lines 4–6 and drainage line 9. Tank 1 also has means 7 and 8 for registering the liquid level in tank 1 and for measuring the pH of the liquid in tank 1, respectively, The preferred embodiment further comprises a flotation device 2 which is connected to tank 1 by line 9. The flotation device is provided with feed line 10 and drainage lines 11–13. The preferred embodiment furthermore comprises a tank 3 which is connected to the flotation device 2 by lines 13 and 16. Tank 3 is provided with feed lines 14 and 15 and drainage line 16. According to this preferred embodiment, at least lines 9 and 13 are provided with pumps 17 and 18. The device also comprises a process control system.

The device is preferably operated as follows. Tank 1 is filled via feed line 4 with the protein containing waste water to be purified. Then either the acid is added via feed line 5 or the base via feed line 6 to adjust to the desired pH. The pH is measured by means 8 which is connected to the process control system which regulates whether acid or base has to be added and which regulates the amount thereof which is necessary for adjusting to the desired pH. The reaching of a certain liquid level in tank 1 is measured using means 7 which is also connected to the process control system. When the desired, generally the maximum, liquid level has been reached, tank 1 is emptied, for example to approximately 20% of the total volume. The supply of the waste water to be purified and the adjustment of the pH are maintained.

If the waste water in tank 1 has the desired pH, formation of a first insoluble protein containing material occurs. The mixture of waste water and the first insoluble protein containing material is fed by means of pump 17 to the flotation device via line 9. Once the mixture has been fed to the flotation device, the pump 17 is stopped at a low-level message signal by means 7.

The desired amount of the anionic polymer is then added via line 10. The anionic polymer can also be added before the mixture has reached the flotation device, but it must, however, take place after the mixture has left tank 1. Line 10 can therefore also be placed, for example, between pump 17 and the feed point of the flotation device 2.

As a result of adding the anionic polymer, coagulation and/or flocculation of the colloidal particles such as proteins and fats occurs. In the flotation device 2, the coagulated and/or flocculated particles come into contact with air, in which process a foam is formed. In the flotation device, said foam is separated from the waste water by means of a scraper.

During the flotation, the mixture of the waste water and the first insoluble protein containing polymer is separated into a pre-purified waste water and a protein containing sludge. The protein containing sludge is drained via line 12, while the pre-purified waste water is fed by means of pump 18 via line 13 to tank 3.

Air is fed into tank 3 via supply line 15. This aeration is preferably carried out for at least 4 hours. The desired amount of cationic polymer is fed via supply line 14 into line 16, upstream of flotation device 2. Preferably, the effluent from tank 3 is fed via line 16 to the flotation device 2 in such a way that the cationic polymer is fed at the same point as, that of the feed of the anionic polymer. Line 16 therefore preferably comes out at the same feed point of the flotation device 2 as that of line 10 while line 14 is preferably immediately upstream of said fuel point.

Once the biological sludge flocs, which are formed in tank 3 during a settling phase and which essentially contain constituents other than proteins and fats, have coalesced sufficiently to form a second insoluble material, the effluent is fed via line 16 to the flotation device.

The effluent is then floated to form finely purified waste water which is drained via line 11. The second insoluble material is drained via line 12.

It will be clear to the person skilled in the art that the device may optionally be provided with more means for feeding through the various process streams, for example conveyor belts, pumps and stirring devices.

Since carbohydrates are essentially decomposed in tank 3, carbon dioxide is formed during said decomposition, as a result of which the pH of the pre-purified waste water will drop rapidly to a value of approximately 7.5, which is favourable for the microorganisms present in tank 3.

Another advantage of the method according to the invention is that fats and proteins are removed in the first stage, that is to say during steps (a) and (b). There is therefore scarcely a risk of stench nuisance (mercaptans) occurring during the decomposition of carbohydrates in tank 3. In addition, phosphate is removed during the steps (a) and (b). There is therefore also no risk of the microorganisms present in tank 3 being deactivated by calcification because, as a result of the reduced pH in tank 3, calcium phosphate and, as a result of the presence of carbon dioxide, calcium carbonate can precipitate.

Although the first and the second insoluble materials are drained via line 12, this is not necessary. If it is desired to isolate the two materials separately, it will be clear to the person skilled in the art that the flotation device can optionally be provided with a separate line for draining the second insoluble material. The first insoluble material and the second insoluble material can also be drained via the same line, but to separate storage points.

In another preferred embodiment, tank 3 is provided with an additional direct drainage line 19. In this case, after the desired liquid level of the waste water has been reached in tank 1, the feeding of air to tank 3 it stopped by means 7 and the process control system. Preferably, the aeration in tank 3 is stopped when tank 1 is partly filled, in particular is filled to approximately 60% of the total volume. The second insoluble material can then settle in tank 3. After purification in tank 3, most of the finely purified water can be drained via said additional line 19. The second insoluble material is fed together with the small residual amount of the finely purified waste water to flotation device 2. In the meantime, tank 1 is filled further to approximately the maximum volume, the time duration between the filling of tank 1 from approximately 60% of the total volume to approximately the maximum volume being approximately equal to that which is necessary to settle the second insoluble material, to drain most of the finely purified waste water via line 19 and to feed the second insoluble material and the small residual amount of the finely purified waste water to the flotation device 2. In this case, line 16 is connected to tank 3 in such a way that a level difference is present between line 16 and the bottom of tank 3, with the result that, when the second insoluble material and the small residual amount of the finely purified waste water are fed to the flotation device 2, a small portion of the second insoluble material remains behind in tank 3 for the purpose of purifying a subsequent charge of pre-purified waste water. This takes approximately 15 minutes to 1 hour. Tank 1 is then emptied with the aid of pump 17 to approximately 20% of the total volume, preferably at a flow rate higher than that at which tank 1 is filled with waste water. At the same time, pump 18 ensures that tank 3 is filled with pre-purified waste water at a flow rate which is preferably approximately equal to that with which tank 1 is emptied. An advantage of this method is that a smaller amount has to be processed by the flotation device, as a result of which less energy and less coagulating material is necessary.

According to the invention, the device therefore comprises at least one tank 1, a flotation device 2 and a tank 3, and the further means, pumps and lines 4–19, tank 3 being connected to flotation device 2 by means of line 16 and lines 9 and 13 comprising pumps 17 and 18.

It will be clear that, if essentially only proteins and fats have to be removed, it is possible to make do with a method according to the invention which comprises only the steps (a) and (b) and a device which is suitable for carrying out the steps (a) and (b). The method then comprises (a) making an insoluble protein containing material form and (b) separating the mixture obtained in step (a) to form purified waste water, in which process, during step (a), the pH of the waste water is adjusted to a value of 7–10 and preferably an amount of an anionic polymer is added prior step (b). As is described above, the exceptional expediency of such a method is that in general at least 80% and usually even more than 90% of the proteins and fats are removed during the steps (a) and (b). In this case it has further been found that, if the pH of the waste water has a value of about 7 to about 9, the pH correction is performed in such a way that the pH of the waste water is increased by at least 0.3 during step (a), preferably by at least 0.5. If the pH of the waste water is in the range of 7–8, the pH adjustment needs to be about 0.5, whereas the pH of the waste water is in the range of 8–9, the pH correction may be about 0.3. However, if the pH of the waste water is above about 9.5, the pH needs to be decreased to a value of about 7.5 and then increased to a pH of about 8. Consequently, it is in general only necessary to increase the pH of the waste water by only a relatively small value, i.e. about at least 0.3 to about 0.5, which has the advantage that less chemicals are needed for removing proteins, fats and phosphate from the waste water. A suitable device will then comprise a tank (1) and a flotation device (2), tank (1) being provided with feed lines and drainage lines (4)–(6) and (9) and means (7) and (8) for registering the liquid level and for adjusting the pH of the liquid in tank (1), respectively, the flotation device (2) being connected by line (9) to tank (1) and being provided with feed lines and drainage lines (10)–(13), at least line (9) being provided with a pump (17) and a process control system.

The method and the device according to the invention are primarily suitable for purifying waste water from a foodstuffs processing factory. Examples of a factory of this type are milk-processing factories and creameries. The method and the device according to the invention are suitable, in particular, for purifying waste water from a cheese factory, i.e. waste water originating from the preparation of cheese.

The method and the device according to the invention can also be used if the purification in tank 1 is carried out at a pH of less than 7. This has, however, the disadvantage that the pre-purified waste water has first to be neutralized with a base before it is fed to tank 3. In addition, as a result of the formation of carbon doxide, the pH has to be kept at a value of approximately 7 by adding base. In addition, no phosphate will be removed in tank 1 because of the acidic pH. If the pre-purified waste water still containing phosphate is brought into contact with a base in or upstream of tank 3, there is a risk that phosphate and possibly carbonate may precipitate, which may give rise to calcification of the microorganisms present in tank 3.

What is claimed is:

1. Method for purifying protein containing waste water, comprising the steps:

(a) causing a first insoluble protein containing material to form in the waste water, (b) separating the mixture obtained in step (a) to form pre-purified waste water, (c) treating the pre-purified waste water with aerobic microorganisms, (d) separating the mixture obtained in step (c) to form finely purified waste water, wherein step (b) and step (d) are carried out in the same device, and wherein an amount of an anionic polymer is added prior to step (b).

2. Method according to claim 1, wherein steps (b) and (d) are alternately carried out in the same device.

3. Method according to claim 1, wherein step (a) is carried out during steps (b) and/or (c) and/or (d).

4. Method according to claim 1, wherein an amount of a cationic polymer is added after step (c).

5. Method according to claim 1, wherein the protein containing waste water originates from the preparation of cheese.

* * * * *